United States Patent Office 3,294,062
Patented Dec. 27, 1966

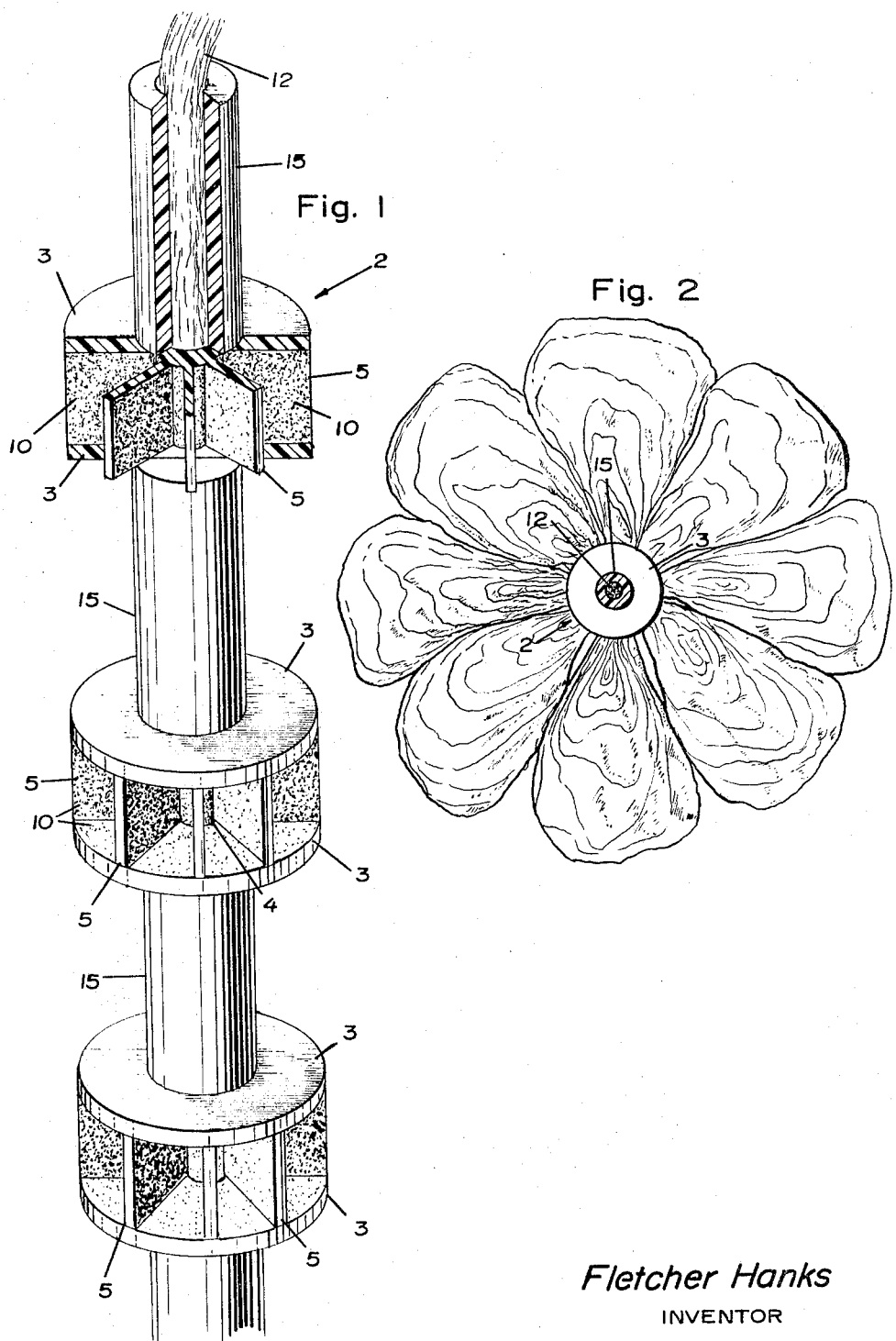
Fletcher Hanks
INVENTOR
BY Geib and Porter
ATTORNEYS

3,294,062
METHOD AND APPARATUS FOR
CULTIVATING OYSTERS
Fletcher Hanks, 22 Port St., Easton, Md. 21601
Filed Aug. 27, 1965, Ser. No. 483,209
7 Claims. (Cl. 119—4)

This invention relates to the production of oysters and more particularly to the modification or control of the natural growth thereof.

It is, of course, well known that the spawn or larvae of the oyster, which is frequently referred to as spat, attaches itself to stones, old shells of oysters, etc. and will cling thereto until the soft shell forms and the young oyster seed are created.

The underwater material to which the spat attaches itself is known as culch, or cultch; and if too freely exposed, such as when lying on the bottom, makes the oyster set vulnerable to attack by numerous underwater enemies such as starfish, crabs, drumfish, drills, etc. Also it is sometimes smothered by shifting bottoms.

In the past there have been a number of proposals for improving culch and accessability to the oysters growing therefrom; some of which include suspended strings or the like carrying enlarged culch members or areas. Such suspension of the culch desirably maintains it in spaced relationship with respect to the bottom of the waterway or oyster grounds, and therefore free from attack by drills, starfish and other crawling enemies. However, the spat is still readily accessible to drumfish, crabs, etc.

Among the objects of the present invention is the control and direction of oyster growth by the provision of improved culch means, the control being such as will not only elevate the same out of contact with the bottom, but will shield it to some extent from natural enemies which are not confined to crawling. Even more importantly, oysters are obtained which are closely uniform in size and shape.

Another object is to permit the growth of the oyster to maturity from a housing which is suspended in the oyster-growing water on a rope, wire or string; after which the housing may be raised and the grown oysters quickly and easily harvested, thus reducing harvesting labor to a minimum.

Still another object is to keep the growing oysters above the bottom where there is more food available for them, whereby they grow faster, and stay healthier and fatter.

Still another object of the invention is to provide an apparatus and technique which will permit the unitary transfer of a large number of growing oysters from one location to another location where growing conditions and flavor conditions are more favorable.

A still further object is to provide an apparatus or device of the class described which will efficiently operate in the manner aforesaid and which, at the same time is cheap and easy to manufacture and very durable in service.

The foregoing and other objects and advantages of the invention will be more fully understood after referring to the following description taken in conjunction with the accompanying drawings, in which:

FIGURE 1 is a fragmentary elevational view, partly in section, illustrating a device which embodies the teachings of the present invention; and FIGURE 2 is a top plan view of the showing of FIGURE 1, showing oysters growing outward from the device.

Referring more particularly to the drawings, the numeral 2 generally designates the culch supporting and growth controlling element of the invention, the same being shown as comprising a pair or a series of horizontally disposed, centrally apertured, circular plates 3 which are separated by a centrally disposed hollow tubular member 4 having a series of integrally formed and radially extending plates 5 in approximately evenly spaced relationship.

The radially extending plates 5 may vary in number but in any event provide pie-shaped compartments of the same general size and configuration.

The sides of the radially extending plates 5, and particularly those portions which are adjacent the centrally disposed hollow tubular member or hub 4, are roughened such as being grouted as indicated at 10; thus rendering these areas conducive to the catching of the spat and the setting of the oyster resulting therefrom. In this manner an oyster is made to grow horizontally outward from a horizontally extending and initially sheltered area in each of the pie-shaped compartments.

The remainder of the device, including the tops and bottoms of the circular plates 3 are smooth or unroughened, thereby reducing to a minimum tendency of the spat to attach itself thereto.

In operation, a plurality of devices of the type described, say a dozen or more in number, are threaded onto a suitable rope, wire, or cord 12 which passes through the centrally disposed tubular members 4 thereof. Preferably the individual devices, composed of the centrally apertured plates 3, tubular member 4 and radially extending vertical plates 5, are maintained in spaced relationship by tubular spacers 15. The spacers are not necessary in the early stages of the oyster's life, but as it grows, proximity of one layer of oyster to another (determined by the spacers) directs the horizontal growth of the oysters.

The aforementioned elements, including the rope, wire, or cord 12, may be made of any suitable material, including various plastics so that it can be used repeatedly after removing the oysters at maturity.

While the size of the elements may vary, it is contemplated that the centrally apertured plates 3 be of a size suitable to catch and protect young oysters and direct their growth from apertures outwardly.

Oyster growing houses or containers of the construction described assure the growing of a close assemblage of oysters of uniform size and shape, and this is particularly appealing to the half-shell or raw oyster trade wherein usually lots of six to twelve are served on a plate.

These oysters of assuredly uniform size and shape can be more readily shucked by machinery than wild oysters of varying shapes.

By growing oysters in the manner described the meat withdraws from the end of the oyster leaving the hinge so that the hinge-end can be mechanically sawed off without cutting the oyster meat, thereby leaving an opening between the two shells for the easy entry of a mechanically operated blade to shuck or cut the adductor muscle from the shell.

Having thus described the invention what I claim as new and desire to secure by Letters Patent is:

1. The method of raising mature oysters from spat comprising the steps of providing a smooth outer surfaced housing, arranging at least one suitably sized limited access opening in the periphery of said housing, presenting a roughened interior wall housing surface to the spat, immersing the housing in a suitable oyster growing water habitat and removing the housing from the water when the oysters are mature.

2. The method of claim 1 including the steps of providing a plurality of access openings in said periphery and suspending a plurality of said spaced housings from a suspension support in said water habitat.

3. Apparatus for growing oysters comprising a housing adapted to be submerged in a body of oyster-growing water; said housing being relatively smooth on the outside and having an outwardly opening recess defined by a pair of substantially vertically extending convergent sidewalls located between a pair of horizontally extending plates; at least one of the sidewalls of said recess having a rough surface for the attachment thereto of oyster spat.

4. Apparatus for growing oysters comprising a housing adapted to be submerged in a body of oyster-growing water; said housing having a relatively smooth outer surface and having a plurality of peripheral recesses each defined by a pair of substantially vertically extending convergent sidewalls located between a pair of horizontal plates; at least one of the sidewalls of each recess having a rough surface for the attachment thereto of oyster spat.

5. A shelter for growing oyster spat comprising a pair of horizontally spaced apart superimposed plates having vertical walls outwardly extending from the center thereof defining spat receiving recesses, said recess walls having rough surfaces, and suspension means for said shelter.

6. The apparatus of claim 5 wherein said walls have inner ends abutting a vertical axial cylinder receiving said suspension means.

7. The apparatus of claim 6 wherein the suspension means includes a plurality of spacing means for mounting a plurality of said shelters one above the other.

References Cited by the Examiner

UNITED STATES PATENTS

| | | | |
|---|---|---|---|
| 2,853,049 | 9/1958 | Glancy | 119—4 |
| 3,017,857 | 1/1962 | Munz | 119—4 |

FOREIGN PATENTS

| | | |
|---|---|---|
| 1,184,250 | 2/1959 | France. |
| 1,360,273 | 3/1964 | France. |
| 3,506 | 10/1875 | Great Britain. |

SAMUEL KOREN, *Primary Examiner.*

ALDRICH F. MEDBERY, *Examiner.*